United States Patent [19]

Kane et al.

[11] Patent Number: 4,589,447

[45] Date of Patent: May 20, 1986

[54] METHOD OF DEPOSITING A MEMBRANE WITHIN A CONDUIT

[75] Inventors: John L. Kane; G. Richard Machlan, both of Newark, Ohio

[73] Assignee: Owens-Corning Fiberglas Corporation, Toledo, Ohio

[21] Appl. No.: 722,974

[22] Filed: Apr. 12, 1985

Related U.S. Application Data

[63] Continuation of Ser. No. 519,939, Aug. 3, 1983, abandoned.

[51] Int. Cl.⁴ .............................................. F16L 55/16
[52] U.S. Cl. .................................. 138/98; 29/402.09; 29/451; 29/452; 29/456
[58] Field of Search ............... 29/402.09, 446, 452, 29/451, 456; 138/140, 97, 98

[56] References Cited

U.S. PATENT DOCUMENTS

| | | |
|---|---|---|
| 2,300,057 | 10/1942 | Meyer . |
| 2,329,286 | 9/1943 | Meyer . |
| 2,948,954 | 8/1960 | Ramsa .................... 29/173 X |
| 2,961,749 | 11/1960 | Brown, Jr. et al. ............ 29/451 X |
| 3,034,869 | 5/1962 | Peterson ................... 29/451 UX |
| 3,267,967 | 8/1966 | Guthrie ..................... 138/97 |
| 3,474,832 | 10/1969 | Broadhead et al. ............ 138/97 |
| 3,787,956 | 1/1974 | Miller ...................... 29/451 |
| 3,895,652 | 7/1975 | Zach ....................... 29/450 X |
| 4,080,706 | 3/1978 | Heilman et al. .............. 29/173 |
| 4,109,684 | 8/1978 | Fernandez .................. 138/97 |

Primary Examiner—Charlie T. Moon
Attorney, Agent, or Firm—Ronald C. Hudgens; Robert F. Rywalski; Greg Dziegielewski

[57] ABSTRACT

A method of depositing a coiled member and, optionally, a membrane in a conduit in contact with the walls of the conduit involves placement of the coiled member in the conduit in a longitudinally expanded condition and releasing the force on the coiled member to cause it to contract and expand against the walls of the conduit.

8 Claims, 4 Drawing Figures

METHOD OF DEPOSITING A MEMBRANE WITHIN A CONDUIT

This is a continuation, of application Ser. No. 519,939, filed 8/3/83, now abandoned.

This invention relates to a method of depositing an object in a conduit.

In one of its more specific aspects, this invention relates to a method of repairing a conduit.

BACKGROUND OF THE INVENTION

Damage of conduits is well known. Such damage can occur in the form of holes, cracks, and the like. It frequently occurs that such damage takes place in conduits which are not easily accessible because of location. Such a conduit, for example, can be located underground as is a sewer line. The method of this invention is directed to facilitating such repair.

STATEMENT OF THE INVENTION

According to this invention, there is provided a method of positioning a coiled member, or spring, within a conduit which comprises exerting a longitudinally expanding force on a coiled member, inserting the expanded coil member in a conduit and releasing the force on the member to expand the coil outwardly into contact with the conduit.

In one embodiment of the invention, a flexible sleeve is positioned over the coiled member and thereby positioned between the coiled member and the conduit upon the outward expansion of the coiled member.

DESCRIPTION OF THE INVENTION

The method of this invention will be described in terms of employment of the embodiments of the figures without intending to limit the invention thereto.

The method of this invention is employable in any size conduit employed for any purpose. It is particularly suitable for use in conduit of from about 2 to about 15 inches in diameter which conduit is inaccessible, such as a sewer line, but which conduit has an access opening thereinto.

Any suitable coiled member, or spring, can be employed. One particularly suitable coiled member is made of fiberglass reinforced resin formed with a spiral slice.

Suitable coiled members can be made from FRP pipe using, for example, A. O. Smith Red Thread FRP or Green Thread glass fiber reinforced epoxy pipe. Such a member will comprise a continuous coiled flat band of any suitable length, will have a band width of from about 1 to about 10 inches and a coil thickness of from about 0.100 to about 0.500 inch.

Figure 1:
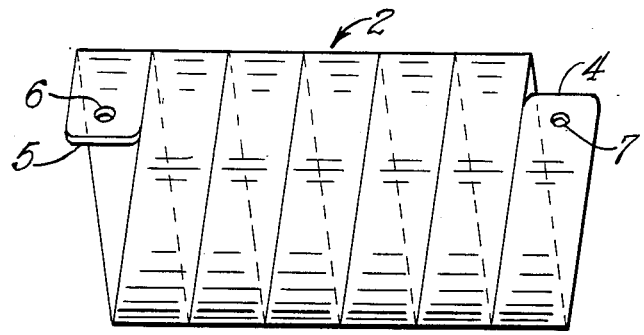
FIG. 1 is a view of one embodiment of a coiled member suitable for use in the method of this invention.

As shown in FIG. 1, the coiled member will have terminals 4 and 5 in which are positioned openings 6 and 7, respectively. The coiled member can have either a right or left hand pitch. The flat sections are preferably rectangular.

The coiled member will have a diameter in its relaxed position greater than the internal diameter of the conduit into which it is to be inserted. The coiled member is introduced into the conduit in a tortionally loaded, or twisted and elongated condition, from which condition it is released after insertion to expand outwardly and to exert a pressure against the internal wall of the conduit.

The coiled member can be designed to exert any desired pressure P according to the formula:

$$P = \frac{Eh^3 \phi}{24r^3 r_0}$$

wherein:
E = modulus of elasticity of the material from which the coiled member is fabricated;
h = thickness of the flat section of the coiled member;
$r_0$ = the outer radius of the coiled member in the unstrained state;
r = the outer radius of the coiled member in the torsionally loaded state;
$\phi = (r_0 - r)$ = the extent of deformation (bending) of the coiled member.

To illustrate, assume a coiled member spirally cut from FRP pipe and encased in a 0.09375 inch elastomeric membrane as hereinafter discussed. Assume insertion in a 4 inch internal diameter conduit. The coiled member will have a strained radius of 1.906 inches and, assuming a section thickness of the coiled member as 0.110 inch and a tensile modulus of $3 \times 10^6$ psi, the pressure which will be exerted against the inner wall of the pipe will 4.03 psi.

The coiled member can be of any suitable thickness. Coiled members which develop about 10 psi against the internal wall of the pipe are generally satisfactory.

The coiled member can be positioned within the conduit in any suitable manner. One carrier, or insertion device is shown in FIG. 2.

Figure 2:
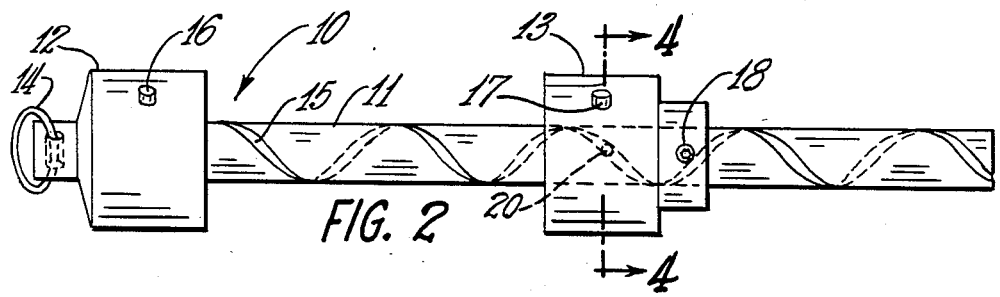
FIG. 2 is a view of one embodiment of a carrier means employable to insert the coiled member in the conduit; and, FIG. 3 is a view of the coiled member positioned on the carrier means, with a flexible sleeve positioned over a portion of the coiled member.

Referring to FIG. 2 there is shown device 10 comprising rod 11, fixed bushing 12 and movable bushing 13.

Rod 11 has at its one end attachment means, for example, a ring 14 afixed thereto. While bushing 12 is fixed, bushing 13 is free to rotate and move longitudinally along rod 11 in helix 15. Each of bushings 12 and 13 have studs 16 and 17, respectively, positioned therein. Bushing 13 is also adapted with set screw 18 for fixedly positioning the free bushing along the length of the rod as described hereinafter. The pitch of the helix 15 on rod 11 substantially equal to that of the coiled member in order to obtain the correct dynamic behavior of the coiled member upon release as hereinafter described.

Figure 4:
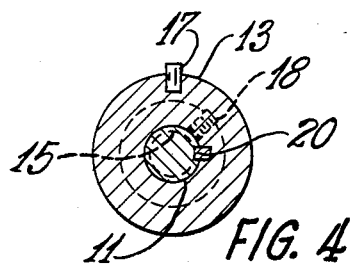
FIG. 4 is a cross-sectional view through section 4—4 of FIG. 2.

As shown in FIG. 4, bushing 13 has a downward projection 20 such that when bushing 13 moves towards bushing 12 as hereinafter described, bushing 13 rotates helically.

The coiled member can be inserted into the conduit alone, or it can be encompassed with a sleeve such that upon placement of the combination within the conduit, the sleeve is positioned between the coiled member and the inner conduit wall. While the sleeve can be comprised of any suitable material, it will preferably be comprised of a flexible material such as vulcanized butyl rubber or any material inert to the material transported in the conduit.

Figure 3:
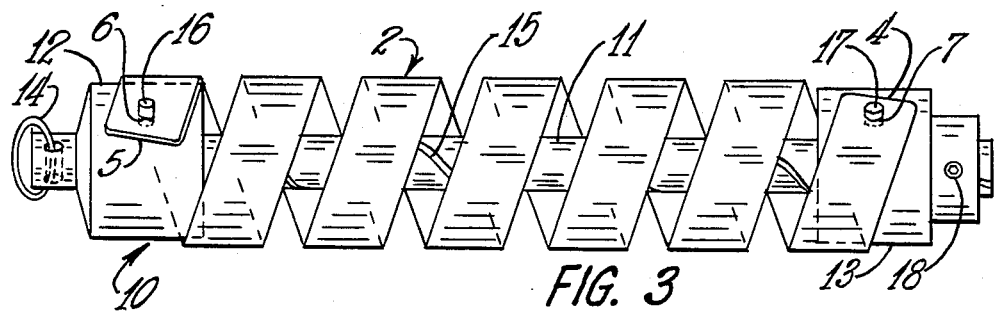

Referring now to FIG. 3, there is illustrated the positioning of the coiled member on the insertion device. The coiled member 2 is slipped over the insertion device 10 with openings 6 and 7 positioned on studs 16 and 17. The free bushing 13 is then rotated outwardly along the length of the rod 11 and away from bushing 12, thus producing a simultaneous decrease in diameter and increase in length of the coiled member.

When the coiled member is sufficiently decreased in diameter as to permit the combination to be inserted in the conduit, the free bushing 13 is locked into position in the twisted coil state by lock-release mechanism, or set screw 18. If employed, a sleeve 21 is placed over any portion of the twisted coil member and the entire mechanism is placed in the conduit.

The mechanism can be positioned in the conduit by pulling it thereinto by means afixed to ring 14. When positioned as desired as determined by any suitable means, the lock-release mechanism on bushing 13 is released. The freed bushing then moves towards the fixed bushing, the coiled member untwists and expands outward into a position of compression against the wall of the conduit. At the same time, momentum carries the slots 6 and 7 off of studs 16 and 17, with the sleeve, if employed, positioned between the coiled member and the inner wall of the pipe.

The insertion device is then withdrawn leaving the coiled member in outward compression to force the sleeve in sealing arrangement against any defect which may have been present in the conduit.

It will be evident from the foregoing that various modifications can be made to the method of the invention. Such, however, are considered within the scope of the invention.

We claim:

1. A method of repairing a rigid conduit having a damaged section in the form of holes, cracks and the like comprising:
    (a) torsionally loading a longituddinally extending closely wound uniform outside diameter resilient coiled member to decrease the outside diameter of said member to a diameter less than the inside diameter of said conduit and to increase the length of said member;
    (b) positioning said torsionally loaded member in said conduit at said damaged section;
    (c) positioning a sleeve of elastomeric material between said torsionally loaded member and the damaged section of the conduit;
    (d) releasing said load to permit said member to radially expand and decrease in length in said conduit at said damaged section, said coiled member having a length, thickness and expansion force sufficient to (1) force the sleeve against the interior of the conduit at the damaged section to seal said damaged sction and (2) structurally support said damaged section of conduit; and
    (e) leaving said radially expanded member in said conduit as a reparir of said damaged section.

2. The method of claim 1 in which a flexible sleeve is positioned over said member.

3. The method of claim 1 in which said member is comprised of fiberglass reinforced plastic.

4. The method of claim 1 in which said member comprises a coiled flat band.

5. The method of claim 1 in which said coiled member upon expansion exerts a force of about 10 psi against the internal wall of said conduit.

6. In a method of repairing a damaged section of a sewage conduit having an inside diameter from about 2 to about 15 inches, the improvement comprising:
    (a) twisting and longitudinally extending a longitudinally extending closedly wound uniform outside diameter resilient helically coiled member to simultaneously (1) decrease the outside diameter of the member to less than the inside diameter of the conduit and (2) to increase the length of the coiled member;
    (b) positioning said twisted and extended member in said conduit at the damaged section; and
    (c) releasing said member to permit said member to radially expand and decrease in length to contact said damaged section, said coiled member having a length, thickness and expansion force sufficient to (1) at least partially seal such damaged section and (2) structurally support said damaged section of conduit whereby a permanent repair of the damaged section is effected.

7. The method of claim 6 further comprising: positioning a sleeve of flexible elastomeric material between said coiled member and said damaged section, said coiled member being effective to force the sleeve against the interior wall of the conduit at the damaged section to at least partially seal the damaged section.

8. The method of claim 7 wherein said coiled member is comprised of a band of fiberglass reinforced plastic band having a band width from about 1 to about 10 inches and a coil thickness from about 0.1 to about 0.5 inches.

* * * * *